United States Patent [19]

Ramsay

[11] 4,035,084
[45] July 12, 1977

[54] AUTOMATIC LEVELLING METHOD AND APPARATUS FOR ROTATING LASER BEAM TRANSMITTER

[76] Inventor: James D. Ramsay, 102 S. Clark Ave., Los Altos, Calif. 94022

[21] Appl. No.: 659,413

[22] Filed: Feb. 19, 1976

[51] Int. Cl.² .................... G01B 11/26; G05B 1/06
[52] U.S. Cl. .................................. 356/152; 33/291; 318/640; 318/648; 356/172
[58] Field of Search ................... 356/172, 152, 141; 318/648, 640; 33/291, 292, 295

[56] References Cited

U.S. PATENT DOCUMENTS

| | | | |
|---|---|---|---|
| 3,471,234 | 10/1969 | Studebaker | 356/3 |
| 3,588,249 | 6/1971 | Studebaker et al. | 356/4 |
| 3,865,491 | 2/1975 | Hogan | 356/172 |
| 3,936,197 | 2/1976 | Aldrink et al. | 356/172 |

FOREIGN PATENT DOCUMENTS

2,000,828  7/1970  Germany .......................... 356/141

Primary Examiner—Maynard R. Wilbur
Assistant Examiner—S. C. Buczinski

[57] ABSTRACT

Transmitters generating rotating laser beams are commonly employed for surveying and earth working equipment control purposes. This invention relates to a method and apparatus for automatically maintaining the rotating laser beam in a required plane which is either exactly horizontal or at a known angle to the horizontal. The apparatus includes two remotely located laser beam reflectors which, when traversed by the rotating laser beam, respectively reflect the beam back to the transmitter along a path parallel to, but vertically displaced from the original path of the beam from the transmitter. Receiving equipment at the transmitter analyzes the vertical positions of the two reflected beams and effects any required correction of the position of the transmitter to maintain the rotating laser beam in the desired plane.

5 Claims, 11 Drawing Figures

AUTOMATIC LEVELLING METHOD AND APPARATUS FOR ROTATING LASER BEAM TRANSMITTER

BACKGROUND OF THE INVENTION

Equipment for generating a rotating laser beam, generally disposed in a horizontal plane, or a plane tilted at a known number of degrees from the horizontal, is now widely used in the construction and earth working industries. As described in Studebaker U.S. Pat. No. 3,588,249 such transmitters generally involve a tripod support for a laser beam generator which produces a vertically directed beam. The beam is caused to impinge upon a generally horizontal surface of a rotating pentaprism and the beam emitted from the pentaprism is exactly at a ninety degree angle with respect to the incident beam and sweeps through a generally horizontal plane, which will be exactly horizontal if the incident generated beam is exactly vertical. Three thumb screws and two mutually perpendicular levels are generally employed on the transmitter to effect vertical adjustment of the emitter laser beam to cause it to lie exactly in a vertical plane, thus resulting in the rotating beam being exactly horizontal.

In many applications, for example, when utilizing the rotating laser beam to control ditching equipment, it is preferrable that the plane defined by the rotating laser beam be tilted from the horizontal by a known number of degrees corresponding to the desired pitch or fall of the drainage trench being dug. This has been conveniently accomplished in the past by employing sine bar type adjusting mechanisms for the bubble type levels provided on the transmitter. The plane defined by rotating beam may then be either initially adjusted to lie in an exactly horizontal plane or in any plane tilted by a known number of degrees with respect to the horizontal.

It is obviously desirable that once the plane of the rotating laser beam has been determined, the beam should continue to maintain the plane throughout the working period of the equipment that it is controlling or the surveying operation for which it is being used as reference plane. Unfortunately, in the course of a normal working day, temperature changes, changes in wind velocity and ground vibration due to the passage of heavy equipment near the transmitter, all can have the effect of disturbing the initial adjustment of the plane of the rotating laser beam. It has therefore been necessary for the operators to make periodic checks of the planar position of the rotating laser beam in order to assure that it has not drifted from the desired setting. Since such checks must necessarily be periodic, this opens the opportunity for the laser beam reference plane being in error for a substantial period of time without knowledge of the equipment operator or the surveying crew. It is therefore apparent that any mechanism which would continuously monitor the position of the rotating laser beam to determine if it did in fact correspond with the desired position and then, when a departure was detected, automatically effect a correction of the plane defined by the rotating laser beam back to the initial desired position, would be a highly desirable and advantagous improvement in this type of equipment.

Accordingly, it is an object of this invention to provide a method and apparatus for continuously monitoring the position of the plane defined by the rotating laser beam to generate a signal whenever such plane departs from a desired position.

A further object of this invention is to provide a method and apparatus for automatically effecting a correction of the plane defined by a rotating laser beam to restore such plane to a desired position anytime that the beam tends to depart from the desired position.

Further objects and advantages of the invention will be apparent to those skilled in the art from the following detailed description, taken in conjunction with the annexed sheets of drawings.

DESCRIPTION OF THE INVENTION

Figures 1, 1A:
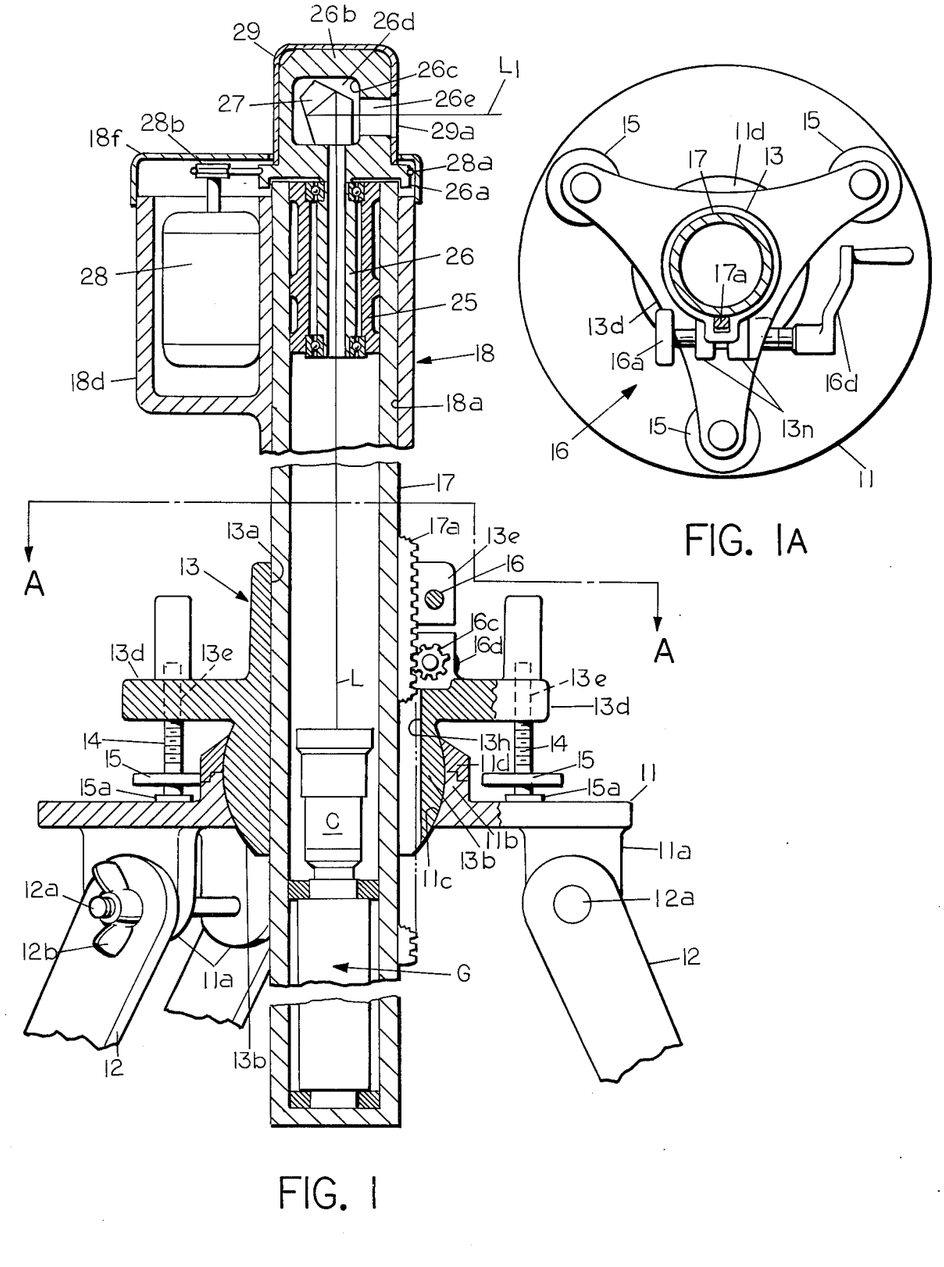
FIG. 1 is a vertical sectional view of a conventional laser beam transmitter.
FIG. 1a is a horizontal sectional view taken on the plane A—A of FIG. 1.

Referring to FIG. 1, a conventional laser beam transmitter 10 is shown of the type heretofore manufactured and sold by Laserplane Corp. of Dayton, Ohio. The transmitter 10 comprises a tripod support structure made up of an annular base 11 having three peripherally spaced sets of depending ears 11a to which three bifurcated support legs 12 are respectively secured by bolts 12a and wing nuts 12b. The center portion of base 11 comprises an integral upstanding annular flange 11b, having its inside surface machined to define an annular internal spherical segment surface 11c. A support casting 13 is provided having a cylindrical bore 13a extending therethrough. The lowest portion of support casting 13 is machined to form an external annular spherical segment surface 13b which cooperates with surface 11c. Hence the axis of the cylindrical bore 13a is readily shiftable through an infinite number of inclined positions relative to the true vertical. Support casting 13 is movably secured to base 11 by a two piece ring 11d which defines an internal annular spherical segment surface 11e which cooperates with the top portions of spherical surface 13b. Ring 11d is secured to base 11 by a plurality of bolts (not shown).

The vertically central portion of support casting 13 is provided with three integral, radially projecting arms 13d, each of which is traversed by a vertical threaded hole 13e at its extremity. An adjusting or levelling screw 14 engages each hole 13e and bears against the top surface of base 11 to determine the position of the axis of the cylindrical bore 13a of the casting 13 with respect to the true vertical. Each adjusting screw 14 is provided with an enlarged thumbwheel portion 15 to facilitate manual adjustment of the screws 14 and a nylon cap 15a on its bottom end.

The top portion of support casting 13 is machined to provide two spaced outwardly projecting clamping ears 13n (FIG. 1A). One ear 13n has a threaded hole and the other ear has an aligned unthreaded hole. A clamping bolt 16 with an enlarged circular head 16a passes through the unthreaded hole and threadably engages the threaded hole to draw the two ears 13n together in a clamping action for a purpose to be described.

A generally cylindrically shaped laser beam transmitter housing 17 is provided having an vertically extending rack 17a secured to one side thereof. Housing 17 is slidably inserted within support casting bore 13a and rack 17a cooperates with a similarily shaped vertical slot 13h provided in the support casting 13 and passes between clamping ears 13n. Vertical adjustment of the housing 17 may be conveniently effected by a pinion 16c which is mounted in a transverse hole provided in the support casting 13, engages rack 17a, and is turned by a hand crank 16d. After the crank 16d is operated to position the housing 17 at a desired vertical position, the housing is locked at that position by the clamping bolt 16 which draws the clamping ears 13n of the support casting 13 tightly against the adjacent rack 17a.

A conventional laser beam generator G and collimator C is suitably mounted within the housing 17 so as to produce a collimated laser beam L extending vertically upward along the axis of the housing 17. If the initially generated laser beam L is exactly aligned with the true vertical and then reflected by a rotating penta-prism 27, then the resulting rotating beam L1 will define a true horizontal plane. To permit adjustment of the vertical position of the initially generated laser beam L1 a levelling and motor mounting casting 18 is provided, having a vertical bore 18a therethrough to permit the casting 18 to be slipped over the top portions of the laser housing 17 and to be secured thereto by suitable screws (not shown). An integral horizontal ledge 18b (FIG. 2) is provided on casting 18 near the bottom thereof and this provides a mounting for a first bubble type level indicator 19. Ledge 18b is exactly perpendicular to the axis of laser housing 17 so that when the indicating bubble of indicator 19 is in its center position, the initially generated laser beam L will be lying in a true vertical plane passing through the axis of laser housing 17 and perpendicular to the plane of ledge 18b.

Figures 2, 7:
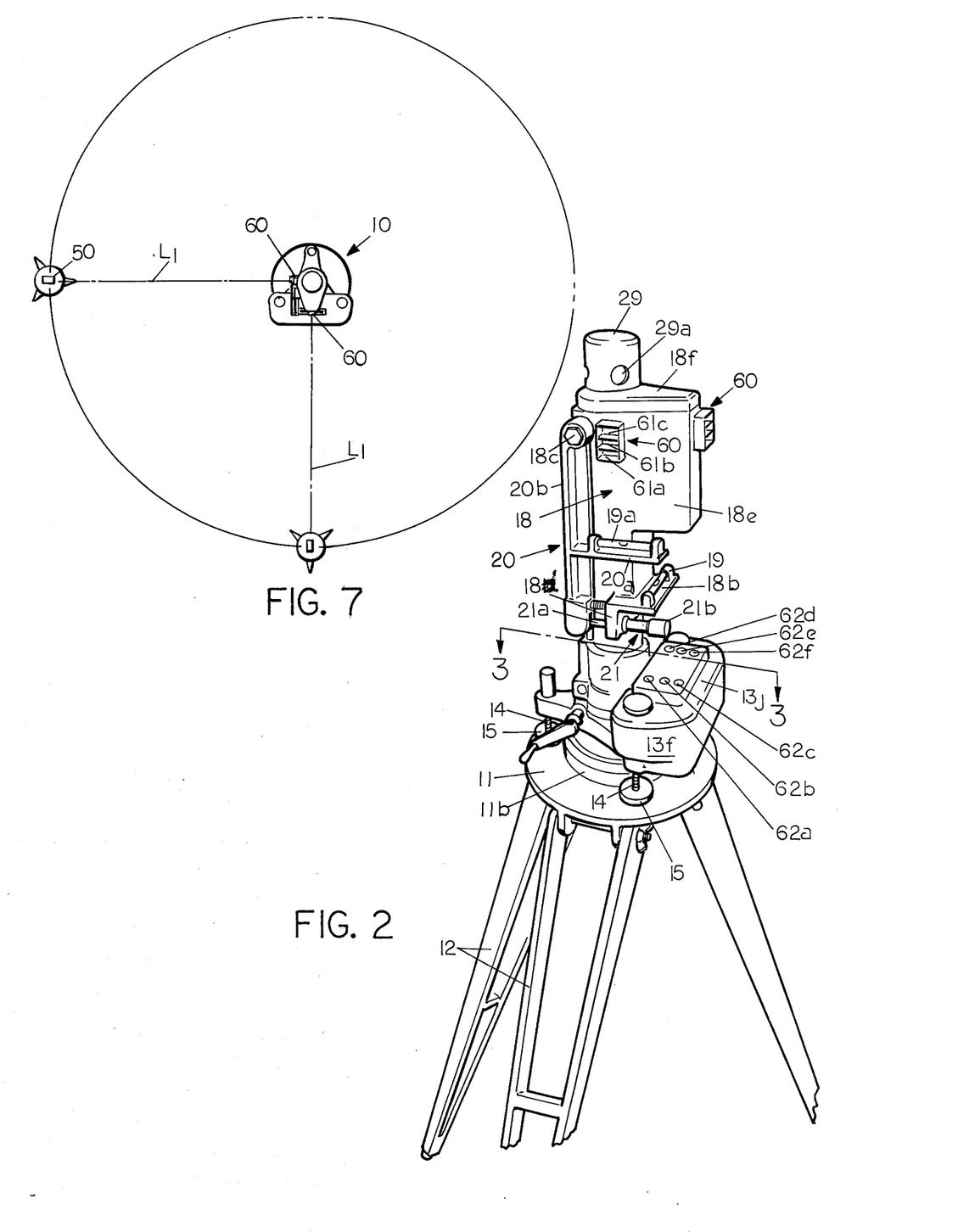
FIG. 2 is a perspective view of a transmitter modified to incorporate automatic levelling mechanisms.
FIG. 7 is a schematic, top elevational view illustrating the positioning of the laser beam reflectors relative to the transmitter.
Figure 3:
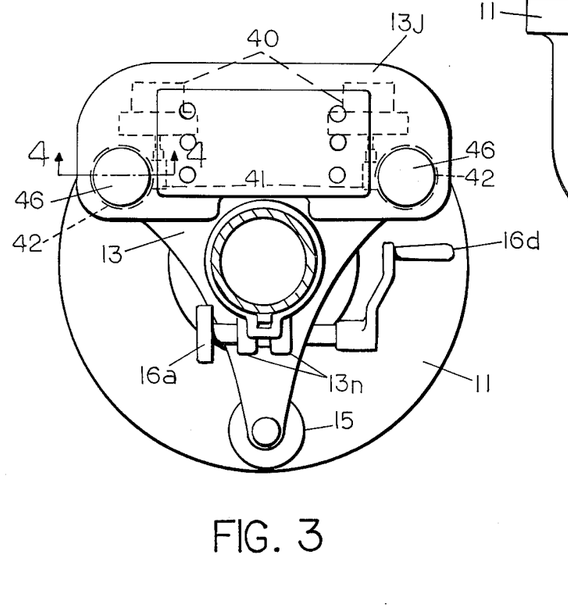
FIG. 3 is a horizontal sectional view taken on the plane 3—3 of FIG. 2.

If it is only required that the rotating laser beam L1 (to be hereinafter described) be maintained in a true horizontal plane, then it is only necessary to provide a second bubble indicator mounted on the ledge 18b but positioned at right angles to the illustrated indicator 19. However, many earth working operations, particularly the digging of drainage trenches, require that the laser beam reference plane be tilted to conform to the pitch or fall of the trench. To provide this additional adjustment, the second bubble level indicator 19a is positioned on the horizontal arm 20a of a conventional sine bar mechanism 20.

The vertical arm 20b of sine bar 20 is pivotally mounted on a horizontal bolt 18c threaded into the top portion of levelling casting 18. The lower portion of arm 20b is engaged by the end of the shaft 21a of a micrometer 21, which is horizontally supported in a suitable hole in a depending flange 18d provided below the ledge 18b. Manual adjustment of the thumbscrew portion 21b of micrometer 21 will than effect minute changes in the vertical position of sine bar arm 20b, hence in the horizontal position of the second bubble level indicator 19a. The micrometer 21 may be suitably graduated so as to indicate the departure of the axis of laser housing 17 from the true vertical in terms of the horizontal slope of the bubble indicator and in units of one tenth of a foot per one hundred feet.

In the top of laser housing 17, a cylindrical bearing support 25 is inserted and secured by suitable screws (not shown). A hollow shaft 26 is journalled in support 25 for rotation about the axis of laser housing 17. On the top of hollow shaft 26 a circular flange 26a is secured. Flange 26a has an upstanding prism housing 26b formed thereon having a generally square opening 26c. A penta-prism 27 is mounted in opening 26c and secured therein by plates 26d bolted to each side of housing 26b. Shaft 26, hence penta-prism 27, are rotated by a belt 28a which engages a groove in the sidewall of circular flange 26a and is driven by a pulley 28b mounted on the shaft of a vertical motor 28. Motor 28 is mounted in an integral, radially projecting open top housing 18e on levelling and motor casting 18. A suitable cover 18f is secured to the top of casting 18.

A radial hole 26e is provided in one of the vertical walls of prism housing 26b to permit the laser beam reflected by penta-prism 27 to pass out of the transmitter 10. A cover cap 29 may be provided to fit over prism housing 26b and it has an aperture 29a aligned with the radial hole 26e.

As is well known, the generated laser beam L will pass upwardly through laser housing 17 and hollow shaft 26 and impinge on one of the faces of penta-prism 27. The penta-prism will produce a rotating beam L1 which will be exactly at ninety degrees to the initial beam L. Since the vertical position of initial beam L is determined by the position of the axis of laser housing 17, and since the vertical position of laser beam housing 17 is precisely controlled by manipulation of levelling screws 14, it follows that the plane defined by the rotating output laser beam L1 may be adjusted to lie in the true horizontal, or at any selected angle relative to the true horizontal by concurrent adjustment of sine bar level indicator 19a.

In any event, the laser beam transmitter 10 is set at a point on the terrain where the elevation is known and from which it is desired to broadcast a laser beam reference plane at a known angle to the horizontal. Let it be assumed that it is desired to use the transmitter 10 to provide a reference plane for control of a ditching machine and it is desired that the ditch being dug have a slope of 0.5 feet per 100 feet. In such event, the transmitter 10 will be set up at a point on the terrain adjacent to the ditching operation where the elevation has previously been determined by conventional surveying techniques and the laser beam housing 17 will be positioned by angularly moving the casting 13 so that the sine bar mounted bubble level indicator 19a is aligned with the desired direction of travel of the trenching machine. The micrometer 21 of the sine bar 20 is then adjusted to provide a slope of 0.5 feet per 100 feet to the bubble level indicator 19a.

The thumbwheels 15 are then actuated to bring both bubble level indicators 19 and 19a to their mid-point position and, at this position, the plane generated by the rotating laser beam L1 will be pitched along the direction of travel of the trench to be dug at exactly 0.5 feet per 100 feet of length.

All mechanisms and operations heretofore described are conventional and well known in the art. The problem to be solved is the fact that temperature variations, or changes in wind velocity, or vibrations produced by heavy earth moving equipment passing the vicinity of the transmitter will cause the vertical position of the laser beam housing 17, or the position of the generated beam L, to shift from that to which it was initially set and hence effect a corresponding shift in the position of the plane defined by the rotating laser beam L1. The mechanism of this invention detects such shift in position of the reference plane defined by the rotating laser beam and effects an appropriate correction to the vertical position of the laser housing 17 to restore the transmitter to the initially set position.

Referring now to FIGS. 2 – 5, at least two of the manually operated levelling screws 14 are additionally provided with motor actuation so as to permit the change of the vertical position of such screws in response to remotely generated signals. The support casting 13 is now provided with a radially projecting housing 13f defining an integral open topped chamber 13g. A cover casting 13j encloses the chamber 13g. Within such chamber, two electric motors 40 are provided, being mounted with their shafts in a horizontal position and with each shaft driving a worm gear 41. Each worm gear 41 in turn engages a spur gear 42 which is keyed to one end of an internally threaded bushing 43 which is threadably engaged with the threads of the manual adjusting screw 14. Bushing 43 is rotatably supported by an hollow cylindrical bearing 44 which amounts in an appropriate cylindrical recess 13h in the housing 13f. Bushing 43 is secured against axial displacement relative to the housing 13f by a snap ring 43a.

Figure 4:
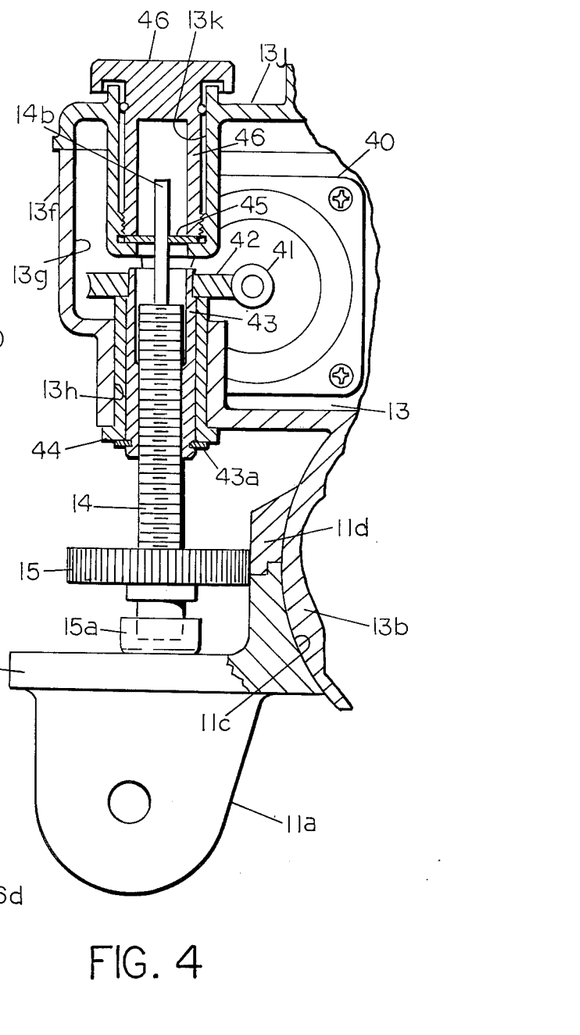
FIG. 4 is an enlarged scale, partial sectional view taken on the plane 4—4 of FIG. 3.
Figure 5:
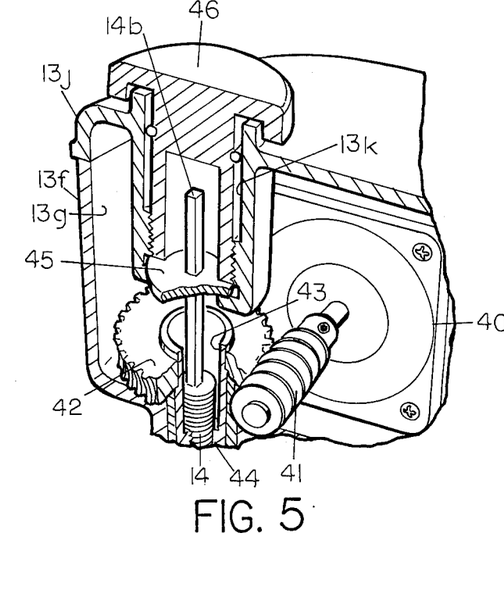
FIG. 5 is an enlarged scale, partial perspective view of a portion of FIG. 4.

Since, for manual adjustment of the screw 14, it is necessary that it be capable of being turned by the thumbwheel 15, each screw 14 obviously must be capable of free rotational movement when operated manually, but must be fixed against rotational movement when the motor 40 is employed to effect the height adjustment. For this purpose, the screw 14 is provided with an elongated rectangular axial extension 14b which projects upwardly into an integral cavity 13k provided in the cover casting 13j. A washer 45 having a square center opening is snugly mounted on the upwardly projecting end 14b of the adjusting screw 14. Washer 45 may be clamped against rotational movement, and thereby prevent rotational movement of the adjusting screw 14, by an annular plug 46 having its bottom end 46 threadably engaged with the lower portions of the cavity 13k.

It follows, therefore, that whenever manual operation of the adjusting screws 14 is desired, the locking plugs 46 must be manually rotated to unclamp the washer 45 but, after the desired manual adjustments of the screws 14 have been made, tightening of the plugs 46 will lock the screws 14 against manual adjustment but still permit vertical adjustment of the height of that portion of the support casting 13 through the respective rotation of bushings 43 by operation of the motors 40. Since two such motors are provided, one for each of two of the adjusting screws 14, it is apparent that a full range of adjustment of the vertical position of the generated laser beam L may be effected by applying appropriate electrical signals to the motors 40 causing them to adjust the horizontal position of the support casting 13 and thus the vertical position of the generated laser beam L.

Figure 6:
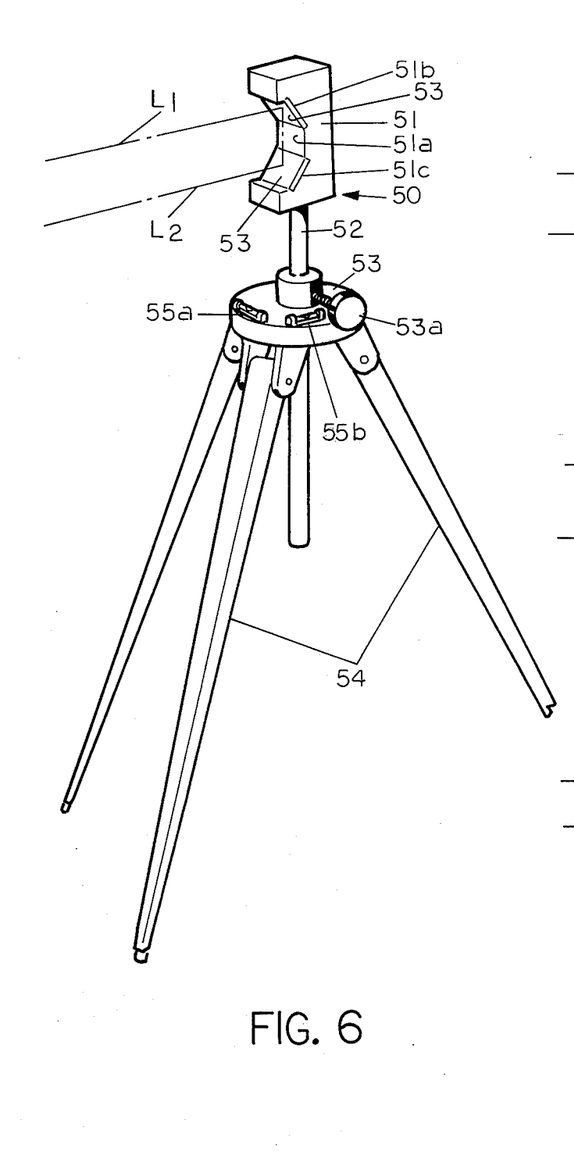
FIG. 6 is a perspective view of a laser beam reflector embodying this invention.

To automatically detect any departure of the rotating laser beam L1 from the desired plane, a pair of reflector units 50 are provided (FIG. 6) which are mounted at some distance from the laser beam transmitter 10 and are preferrably spaced approximately 90° apart with respect to the vertical axis of the initially generated laser beam, as illustrated in FIG. 7. As best shown in FIG. 6, each laser beam reflector 50 comprises a housing 51 which is mounted on a vertical support post 52. The post 52 may be slidably supported by a collar casting 53, which in turn is mounted on tripod legs 54. A clamping screw 53a locks post 52 in any selected vertical position. Mutually perpendicular bubble type level indicators 55a and 55b are provided on casting 53 so that each post 52 may be positioned in a true vertical position.

Figure 8:
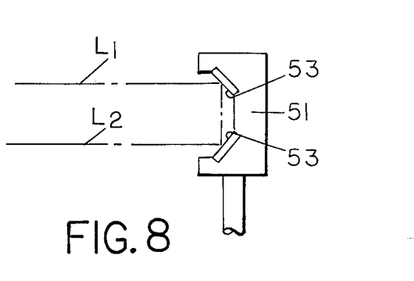
FIGS. 8, 9, and 10 are each vertical sectional views of the reflector portion of FIG. 7 respectively showing the variations in vertical position of the reflected beam as a function of the vertical position of the incident beam.
Figure 9:
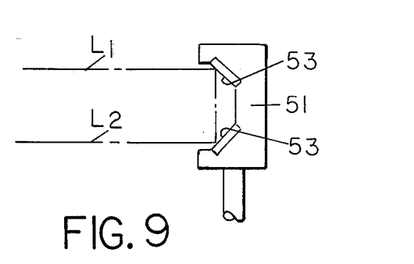
Figure 10:
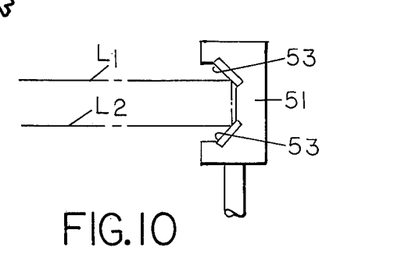

Each reflector housing 51 defines an open cavity 51a having walls 51b and 51c which are respectively disposed at right angles to each other and at 45 degrees above and below the true horizontal when the mounting post 52 is vertical. Along the walls 51b are respectively mounted two plate-like mirrors or prisms 53, each of which will reflect any incident laser beam L1 in a path which will intersect the opposed mirror 53 and re-direct the final reflected beam L2 back to the transmitter 10 along a path exactly parallel to the incident beam L1. However, the vertical spacing of the reflected beam L2 relative to the incident beam L1, will vary, depending upon the vertical position of the incident beam on the mirror 53 that is first engaged by the incident beam. As illustrated by the dotted lines in FIG. 8, if the incident beam L1 strikes the approximate center of the top mirror 53, then the finally reflected beam L2 will be approximately the same distance below a plane passing through the theoretical intersection of the planes of the mirrors 53 as was the incident beam L1. If the incident beam L1 is higher (FIG. 9) and strikes a higher portion of the mirror 53, then the reflected beam L2 will be spaced a greater distance below the incident beam. Conversely, if the incident beam L1 is lower, (FIG. 10) the reflected beam L2 will be spaced closer to the incident beam L1.

It therefore follows that if the plane of the rotating laser beam L1 is shifted from any initial position in which it intersects the approximate center of the reflecting mirror 53, it will produce a reflected beam L2 going back to the transmitter 10 whose vertical spacing relative to the outgoing beam L1 will vary as a function of any displacement of the outgoing beam from its originial position relative to the mirror 53.

Back on the transmitter 10, two sets of laser beam sensors 60 (FIG. 2) are provided, respectively mounted on the side walls of levelling and motor casting 18 at positions that are displaced about ninety degrees around the vertical axis of the initially generated laser beam. Each sensor 60 comprises a vertical stack of at least three laser beam photo cells 61a, 61b, and 61c. Conventional amplifying and logic circuits (not shown) are then provided between the photo cells 61a, 61b and 61c, and the two elevation adjusting motors 40 so that the motors are controlled to effect the necessary adjustment to always bring the reflected laser beams L2 from the remote reflectors back into impingement with the center photo cells 61b. Indicating lights 62a, 62b, 62c, 62d, 62e, and 62f may be provided on the cover 13j of the housing 13f to show which two of the six photo cells is receiving the reflected beam L2. Center lights 62b and 62e indicate that the rotating beam L1 is in the pre-set plane. Lights 62a and 62d indicate the beam L1 is above the pre-set plane respectively at reflectors 50, and lights 62c and 62f indicate a low position of the beam L1.

In the operation of the described equipment, the laser beam transmitter 10 is set up as heretofore described and the rotating beam L1 is positioned in the desired plane, either a true horizontal plane or a plane tilted from the horizontal by a known amount through the manual operation of the adjusting screws 14. The reflectors 50 are then remotely mounted relative to the transmitter 10, preferrably being positioned beyond the immediate area where the earth working or surveying activities are to be accomplished, and each reflector 50 is vertically adjusted by moving its supporting post 52 so as to bring the reflected beam L2 into alignment with the center photo cell 61b of the sensor 60 which is pointed in its direction. The other reflector 50, ninety degrees remote from the first reflector, is similarily positioned and adjusted. The incidence of the reflected beams L2 with the center photo cell 61b may be conveniently indicated by indicating lights 62b and 62e, provided on the laser beam transmitter 10.

From that point on, the equipment will automatically maintain the reference plane defined by the rotating laser beam at the initially adjusted position. Any time that the beam departs from the desired plane, it will strike the reflecting mirrors 53 at either a higher or lower position than the initial setting and hence the reflected beam L2 will be vertically displaced relative to the incident beam L1 and will strike either the lower photo cell 61a or the upper photo cell 61c at the transmitter 10 depending on whether the plane of the rotating laser beam L1 has tilted downward or upward. Through the operation of the amplifiers and logic circuits, the two motors 40 will actuated to adjust the vertical position of the laser beam housing 18 to bring the reflected beam L2 back into incidence with both of the center photo cells 61b, and hence the reference plane back to its desired position.

The economic advantages of the afordescribed invention are believed to be very obvious. It eliminates the necessity for constant operator checking of the reference plane generated by the rotating laser beam to insure that it is still in the desired position. More importantly, it prevents costly and time consuming errors which may occur without knowledge of the surveyors or operators of the earth working machines due to undetected shifts in the position of the reference plane by the rotating laser beam.

Further modifications of this invention will be apparent to those skilled in the art and it is intended that the true scope of this invention be defined solely by the appended claims.

I claim:

1. Apparatus for maintaining a rotting laser beam in a desired generally horizontal plane comprising:
   1. a rotating laser beam transmitter including at least two angularly spaced screws for adjusting the tilt of the plane of the rotating laser beam relative to the horizontal;
   2. a pair of motor means for respectively adjusting said screws;
   3. a pair of laser beam receivers on said transmitter angularly spaced about the axis of rotation of said rotating laser beam receiver, each receiver comprising a vertical stack of laser beam responsive photo cells;
   4. a pair of laser beam reflectors of the type that reflects directly back any incident beam with the reflected beam being vertically spaced from the incident beam by a distance that varies with the height of the incident beam relative to the reflector;
   5. support means for each reflector to position same remote from said transmitter and respectively generally radially aligned with said beam receivers, said support means including height adjusting means for each said reflector to permit manual adjustment of each reflector to receive the incident beam and direct the reflected beam back to energize the center photo cell of said vertical stack of photo cells that is radially aligned therewith; and
   6. logic circuit means for controlling said motor means by said photo cells to adjust said screws to tilt the plane of the rotating beam to maintain said reflected beams respectively incident on the center of said vertical stacks of photo cells.

2. Apparatus for maintaining a rotating laser beam in a desired generally horizontal plane comprising:
   1. a rotating laser beam transmitter including at least two angularly spaced screws for adjusting the tilt of the plane of the rotating laser beam relative to the horizontal;
   2. manual means and motor means for independently adjusting said screws;
   3. a pair of laser beam receivers on said transmitter angularly spaced about the axis of rotation of said rotating laser beam receiver, each receiver comprising a vertical stack of laser beam responsive photo cells;
   4. a pair of laser beam reflectors of the type that reflects directly back a beam parallel to the incident beam but vertically spaced from the incident beam by a distance that varies with the vertical position of incidence of the beam on the reflector;
   5. support means for each reflector to position same remote from said transmitter and respectively generally radially aligned with said beam receivers, said support means including height adjusting means for each said reflector to permit manual adjustment of each reflector to receive the incident beam and direct the reflected beam back to energize the center photo cell of said vertical stack of photo cells that is radially aligned therewith; and
   6. logic circuit means for controlling said motor means by said photo cells to adjust said screws to tilt the plane of the rotating beam to maintain said reflected beams respectively incident on the centers of said vertical stacks of photo cells.

3. The apparatus of claim 1 wherein said laser beam reflectors each comprise a pair of vertically spaced mirrors, with the plane of each mirror being normal to the other and one mirror plane being 45° above the horizontal and the other mirror plane being 45° below the horizontal.

4. The method for automatically positioning and maintaining a rotating laser beam in a desired generally horizontal plane, said rotating laser beam being generated by directing a vertically oriented laser beam generated by a stationary laser generator onto an optical reflecting device rotating about a vertical axis, there being two angularly separated motor driven adjusting screws for adjusting the position of the optical reflecting device relative to the stationary laser beam, thereby tilting the plane of the rotating beam through a plurality of generally horizontal positions, comprising steps of:

1. positioning two laser beam reflectors remotely located from the stationary laser beam generator but within the path of the rotating laser beam, said reflectors being substantially angularly separated in a horizontal plane and arranged to respectively reflect back to said laser beam generator a beam parallel to, but vertically spaced from the rotating laser beam while the rotating beam is traversing the reflectors;
2. positioning two laser beam receivers adjacent said laser generator in the same angular spacing as said reflectors, said receivers including a plurality of vertically stacked laser responsive cells; and
3. controlling said motor driven screws in response to the selective energization of said cells to adjust said screws to position the plane of the rotating laser beam to traverse both reflecting devices at the same vertical position, whereby the relative heights of the two remote reflectors determines the tilt of the plane of the rotating laser beam.

5. The method for automatically positioning and maintaining a rotating laser beam in a desired plane, there being motor driven means for adjusting the position of the axis of rotation of the rotating beam, thereby tilting the plane of the rotating beam through a plurality of positions, comprising the steps of:

1. positioning two indentical laser beam reflectors remotely from said axis of rotation but within the path of the rotating laser beam, said reflectors being substantially angularly separated about the axis of rotation of the rotating beam and arranged to respectively reflect back to said laser beam generator a beam parallel to, but spaced from the rotating laser beam while the rotating beam is traversing the particular reflector;
2. positioning two laser beam receivers adjacent said axis of rotation in generally the same angular spacing relative to said axis as said reflectors so as to be capable of respectively receiving the said reflected beams, each of said receivers including a plurality of laser responsive cells stacked in parallel relationship to said axis; and
3. controlling said motor means in response to the selective energization of said laser responsive cells to adjust the axis of rotation of the rotating laser beam so that the rotating laser beam traverses both reflecting devices at the same relative position, whereby the relative displacements of the two remote reflectors in a plane parallel to the said axis of rotation on the rotating laser beam determines the tilt of the plane of the rotating laser beam.

* * * * *

UNITED STATES PATENT OFFICE
CERTIFICATE OF CORRECTION

PATENT NO. : 4,035,084
DATED : July 12, 1977
INVENTOR(S) : James D. Ramsay

It is certified that error appears in the above-identified patent and that said Letters Patent are hereby corrected as shown below:

In the heading of the patent,
after the Inventor's name, insert -- Assignee: Laserplane
    Corporation, Dayton, Ohio --.

In Column 5, line 29, change "amounts" to -- mounts --.

In Claim 1, line 1, change "rotting" to -- rotating --.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks